Fig. 1.

T. S. WARNER.
LISTER CULTIVATOR.
APPLICATION FILED MAY 2, 1908.

948,030.

Patented Feb. 1, 1910.
7 SHEETS—SHEET 4.

Witnesses
G. Howard Walmsley,
Edward F. Reed.

Inventor
Thomas S. Warner,
By H. A. Toulmin,
Attorney

UNITED STATES PATENT OFFICE.

THOMAS S. WARNER, OF SPRINGFIELD, OHIO, ASSIGNOR TO P. P. MAST AND COMPANY, OF SPRINGFIELD, OHIO, A CORPORATION OF OHIO.

LISTER-CULTIVATOR.

948,030.  Specification of Letters Patent.  Patented Feb. 1, 1910.

Application filed May 2, 1908. Serial No. 430,477.

*To all whom it may concern:*

Be it known that I, THOMAS S. WARNER, a citizen of the United States, residing at Springfield, in the county of Clark and State of Ohio, have invented certain new and useful Improvements in Lister-Cultivators, of which the following is a specification, reference being had therein to the accompanying drawings.

This invention relates to lister cultivators, and the object of the same is to provide a cultivator of this character which is readily adjustable to adapt the same to rows of different width and the cultivating members of which can be readily adjusted to adapt the same for the cultivation of corn at the different stages of its growth; further, to provide a cultivator of this character in which the weight of the cultivating members can be shifted from one side of the axle to the other to throw the weight upon the ground when the cultivating members are in engagement therewith and upon the tongue of the cultivator when the cultivating members are out of engagement with the ground; to provide means for connecting the draft hitch directly to the axle, whereby a part or all of the pull is exerted thereon; and further, to improve the detail construction of the machine by which these results are accomplished, thereby rendering the operation of the machine more effective.

With these objects in view my invention consists in certain novel features of construction and in certain parts and combinations hereinafter to be described, and then more particularly pointed out in the claims.

In the accompanying drawings.

In the preferred form of my invention, the complete cultivator comprises two cultivating units, these units being identical in construction with the exception that the operating mechanism is arranged on the adjacent sides of the two units. These units are entirely independent one of the other and are connected only in such a manner as to cause the same to travel together and to maintain them in substantially lateral alinement, as will be hereinafter described. I have, therefore, shown but one of these units, it being understood that the other corresponds thereto with the exception that the operating levers are shifted to the other side thereof. As here shown, this unit comprises an upwardly extending main frame carrying the cultivating members and mounted to swing relatively to the axle which carries the ground wheels, thereby enabling the frame carrying the cultivating members, which is supported on the axle, to be swung into a position to cause the weight thereof to rest upon the ground or to cause the weight to rest upon the tongue of the cultivator, thus relieving the machine of the weight of the cultivating members and frame and the tendency of such weight to cause the tongue to tilt upwardly. In the preferred form of the device this result is accomplished by providing a substantially U-shaped main frame 1, comprising a substantially horizontal upper portion and two vertical side portions, as shown. The side members of this frame are connected near their lower ends to an axle 2 which preferably has an upwardly extending central portion or arch 3 which is connected to a tongue 4 by means of a suitable clip 5 extending about the upper portion of the arch 3 and secured on the opposite sides thereof to the tongue 4. The axle extends outwardly for a considerable distance on either side of the arch, and each of these outwardly extending portions or spindles 6 is provided with a ground wheel which is adjustably mounted thereon. In the present instance, this wheel comprises an elongated hub 7 which is journaled upon spindles 6 close to the upwardly extending portion or arch 3 and is held against longitudinal movement thereon. Adjustably mounted on this elongated hub 7 and adapted to be moved longitudinally thereof is a ground wheel 8, which, in the present instance, comprises a dish-shaped disk of sheet metal having its concave face turned inwardly. This ground wheel 8 may be adjustably secured to the hub 6 in any suitable manner, but I prefer the clamping mechanism herein shown which comprises a casting or spider 9 secured to the wheel and having a hollow central portion 10 forming an auxiliary hub or casing adapted to fit about the hub 7 and provided on the upper portion of its inner side with a downwardly extending flange 12 having a cut-away portion adapted to fit over the upper side of the hub 7, as shown at 13.

Mounted within the auxiliary hub or casing 10 and fitting loosely about the hub 7 is an eye-bolt 14, the ring or apertured portion of which extends about the hub, while the bolt portion 15 of the same extends through an opening 16 in the casing 10 and is provided with a suitable nut 17, by means of which the apertured portion thereof is brought into engagement with the lower side of the hub 7 and caused to clamp the same firmly against the depending flange 12 forming a part of the casing 10. The wheel is preferably provided with one of these castings 9 on each side thereof and it will be seen that the construction is such that by loosening the nut 17, the wheel can be adjusted to any desired position on the hub 7 and relatively to the main frame, and, by tightening up said nut may be clamped securely in its adjusted position. By this means, I am enabled to secure the full benefit of a long bearing for the ground wheel and, at the same time, secure an adequate amount of adjustment therefor. Further, by making the ground wheel adjustable on the axle instead of making the axle adjustable relatively to the frame, I have greatly simplified the construction and have provided a construction which is not only stronger and more durable, but which operates in a much more satisfactory manner. The inner end of the hub 7 is preferably closed by means of a bracket 18 having a depending portion 19 extending over the end of the hub and an inwardly extending flange 20 extending over the upper portion of the end of said hub, thus effectually closing the same against the entrance of dirt. This bracket is also provided with an upwardly extending portion 21 which is rigidly secured to the upwardly extending portion of the axle by means of clips 22 and is provided on either side thereof with apertured lugs 23, each of said lugs preferably having two apertures arranged one above the other for the purpose which will hereinafter appear.

The main frame 1 may be pivotally connected to the spindle 6 of the axle 2 in any suitable manner. In the present instance, I have shown the lower end of each of the side members of the frame 1 as secured within a socket 24 having a downwardly extending apertured lug 25 which extends about the spindle 6 and serves to pivotally connect the main frame thereto and further serves to close the end of the hub 7 against the entrance of dirt and to hold the same against movement longitudinally of the spindle. A sleeve 26 fits over the outer end of the spindle 6, which extends some distance beyond the end of the main frame, and has one end in engagement with the apertured lug 25 and the other end in engagement with the apertured end 27 of a brace rod 28 which extends between the axle and the tongue of the cultivator. A collar 29 fits over the end of the spindle beyond the brace rod 28 and is provided with oppositely extending apertured lugs 30 and an upwardly extending apertured lug 31, to which is secured one end of a brace or bar 32 extending upwardly and inwardly and secured at its upper end to the adjacent vertical member of the main frame 1 at a point between the ends thereof and serving to brace the ends of the axle against the main frame and to form a rigid connection between those members. A second brace bar 33 extends from the inner side of the vertical member of the frame 1 at a point adjacent to the upper end of the brace bar 32 and is connected at its other end to the horizontal portion of the main frame, thus forming practically a continuous brace between the outer end of the axle and the vertical and horizontal members of the main frame. The collar 29 may be secured to the spindle in any suitable manner, as by means of a split key 34.

The main frame 1 carries the cultivating members and is rocked about its pivotal support upon the axle 2 to cause the weight of the frame and the cultivating members carried thereby to be thrown either to the front or to the rear of that axle, suitable means being provided for so moving the frame. In the present instance, an auxiliary frame 35 extends forwardly from the upper portion of the main frame 1 and is preferably pivotally connected thereto by means of bolts 36 extending through the frame 35 into suitable upright members carried by the brackets 37 mounted on the main frame 1. The forward portion of the auxiliary frame 35 extends some distance beyond the axle 2 and is connected by suitable operating means with a part carried by the axle 2, which part, in the present instance, comprises the tongue 4. The operating means, as here shown, consists of a shaft 38 rotatably mounted in suitable bearings 39 carried by the auxiliary frame 35 near the forward end thereof. This shaft, which is preferably hollow for the purpose which will hereinafter appear, extends beyond the bearing 39 at one side of the frame and is provided with an operating lever 40 having the usual spring-pressed dog 41 adapted to engage a toothed segment 42 supported on the adjacent bearing 39. Rigidly secured to the shaft 38 in such a manner as to be held against rotation relatively thereto are one or more links 43 which have their lower ends pivotally secured to the tongue 4, as shown. Thus, it will be apparent that, when the lever 40 is actuated to rotate the shaft 38 in its bearing the links 43, being rigidly secured to the shaft, will be forced to rotate about their point of pivotal connection to the tongue 4, and, consequently, the upper ends thereof and the shaft to which they are secured and the frame which carries the shaft will be obliged to move longitudinally of the tongue 4, thus rocking the main frame 1 about its pivotal connection to the axle 2. An arm 44 is rigidly secured at one end to the shaft 38 and extends forwardly and downwardly therefrom and has connected thereto one end of a coiled spring 45, the opposite end of which is connected to the main frame 1 and forms a resilient connection between the frame 1 and the shaft 38.

The main frame 1 carries a cultivating member or members which may be of any suitable construction, and, in the present instance, each of the vertical members of the main frame is shown as provided with a cultivating disk 46 which may be supported therefrom in any manner which will permit of the necessary adjustments thereof. In the present instance, each of the vertical members of the main frame 1 is shown as provided with a bracket 47 having a plurality of apertured lugs 48 adapted to receive the bent-over portion 49 of the supporting arm 50. The bent-over portion 49 of said arm is held against longitudinal movement within the apertured lugs 48 and allowed a free rotary movement therein by means of a collar 51 which is rigidly secured to the bent-over portion of the arm between the lugs 48. The collar 51 is preferably secured to the bent-over portion of the arm by means of a set screw 52 which allows the arm to be adjusted relatively to the collar and to the apertured lugs. The outer end of the supporting arm 50 is preferably turned at an angle thereto and is rigidly secured to the upper surface of a plate 53 having its lower surface serrated, as shown. This arm is preferably secured to the plate in such a manner as to hold the same against all movement relatively thereto and this means, in the present instance, consists of a clip 54 extending about the arm 50 and through a projection 55 extending laterally from the serrated plate 53. The upper surface of this plate is also provided with suitable stops 56 adapted to engage the sides of that portion of the arm which is in engagement with the plate 53 and to serve to prevent lateral movement thereof. A second plate 57, having its upper surface serrated to correspond to the serrated lower surface of the plate 53, is mounted beneath the plate 53 and has a downwardly extending portion or plate 58 which is provided at its lower end with a flange or projection 59, through which extends a bolt 60, the upper end of which extends through the plates 57 and 53 and through the arm 50 and is provided with a nut 61, whereby the several parts are firmly connected one to the other. The plate 58 preferably has one of its vertical surfaces serrated, as shown, and is provided with a hollow projection 62 formed at the center thereof and adapted to extend into a corresponding recess formed in a bracket 63 having a vertical face serrated to correspond to the serrated face of the plate 56. A bolt 64 extends through an aperture in the end of the hollow projection 62 and the head thereof is located in said hollow projection in such a manner as to be out of the path of the upwardly extending bolt 60. The bolt 64 extends through the bracket 63 and is provided on its outer end with a nut 65 for securing said members in their adjusted positions. The bracket 63 is also provided with an elongated bearing 66 which is preferably provided with a wooden bushing or bearing surface, as shown at 67, and is adapted to receive the shaft 68 of the cultivating disk 46. The face of the disk 46 fits snugly against one end of the bearing 66 and serves to close the same against the entrance of dirt. The opposite end of the bearing is closed by means of a cap 69 fitting over the same and about the shaft 68, the cap 69 being held in place upon the shaft, and the shaft being held against longitudinal movement relatively to the bearing by means of a split key 70, or any other suitable means. Thus, it will be seen that I have provided the disk with what is in effect a universal joint, but that this joint is so constructed as to enable the same to be rigidly secured in its adjusted position, and, when so secured, to form a strong, durable support for the disk 46. A suitable brace rod extends from the support for the disk 46 to the outer end of the axle and serves to receive a part of the strain imposed upon that disk when the same is in the position shown in Fig. 1. The preferred construction of this brace rod consists of a sleeve 71 secured to the support in any suitable manner, as by means of an apertured lug 72 extending about the bolt 60 beneath the flange 59 of the plate 58. Within this sleeve 71 there is slidably mounted a rod 73 having a hook 74 formed at the outer end thereof and adapted to engage the apertured lug 30 on the rear side of the collar 29 on the outer end of the axle 2, the two members of the brace rod being held in their adjusted position relatively one to the other by means of a set screw 74ª.

In addition to the cultivator disks 46, each vertical member of the main frame 1 also carries a cultivator shovel 75, which is supported by means of a drag bar 76 in such a position as to engage the soil at one side of the path of the disk 46. The drag bar carrying the shovel may be supported on the main frame in any suitable manner, but I prefer to pivotally connect the same thereto, thus enabling the shovel to be moved together with and independently of the main frame. To this end, I have shown the inner end of the drag bar 76 as rigidly secured to one end of a lever 77 which is pivotally mounted on the main frame. In the present instance, I have shown this lever 77 as having its lower portion bifurcated, the arms 78 and 79 thereof extending on the inner and outer sides, respectively, of the main frame. It is also desirable that this lever and support for the drag bar 76 should be adjustable about the vertical member of the main frame 1 in order that the shovel 75 may be moved laterally to adjust the same relatively to the path of the disk 46. For this purpose I have shown the arms 78 and 79 of the lever 77 as pivotally mounted on the outer ends of a bolt 80 extending through a bracket 81 which is adjustably mounted on the main frame 1. The adjustment is preferably accomplished by providing that side of the bracket adjacent to the frame with a flange or projection 82 extending transversely to the vertical member of the frame 1 and having therein a curved recess, as shown at 83, which recess is adapted to receive the vertical member of the main frame 1 and which is secured thereto by means of bolts 84 extending through the bracket 81 on the opposite sides of the main frame member and through a suitable clip 85 located on the side of the main frame member opposite the bracket 81 and having lugs or projections 86 adapted to engage the opposite sides of said frame member. By loosening one of the bolts 84 and tightening the other, the bracket 81 can be rotated about the main frame member 1 to support the drag bar at different angles relatively thereto, thus affording the desired adjustment of the shovel relatively to the disk. Suitable means are provided for controlling the movement of the lever 77 about its pivotal center and causing the drag bar and shovel to move simultaneously with the main frame and also for actuating said lever to move said drag bar and said shovel independently of said frame. In its preferred form, this controlling means consists of a rod 87 connected at one end to the upper end of the lever 77 and connected at its opposite end to a crank arm 88 carried by a shaft 89 journaled in the hollow shaft 38 which is mounted upon the forward end of the auxiliary frame 35. This shaft extends beyond the ends of the shaft 38 and at one end thereof is provided with a lever 90 for rotating the same, which lever is provided with the usual spring-pressed dog 91 adapted to engage a toothed segment 92 carried by the frame 35. Thus, by actuating the lever 90 the shaft 89 may be rotated and the lever 77 actuated to raise or lower the shovel 75. With the lever 90 locked against movement, the operation of the lever 40 and the movement of the main frame 1 forwardly will cause the forward end of the auxiliary frame 35 to be raised as the links 43 move about their pivotal centers. Thus, the forward portion of the auxiliary frame 35, upon which the shaft 89 and crank arms 88 are mounted, is moved a greater distance and at a greater speed than that portion of the main frame to which the drag bar 76 and the lever 77 are connected, and, consequently, the lever 77 will be rocked about its pivotal center at the same time that it is being carried forward by the main frame 1, and, consequently, the drag bar 76 and shovel 75 will be raised a greater distance than they would otherwise. The rod 87 may be connected to the crank arm in any suitable manner, but I prefer to provide the crank arm with bearing lugs 93 through which the rod 87 extends and within which it is held by means of a collar 94. A spring 95 is coiled about the rod 87 between the inner end of the bearing lug 93 and a suitable stop or collar 96 mounted on the rod 87 near the inner end thereof. The tension of this spring is such as to hold the shovels 75 normally in engagement with the ground, but renders the connection between the same and the frame resilient to enable the shovel to accommodate itself to irregularities in the ground and permit of a sudden rise thereof should the wheels of the cultivator drop into a depression in the surface of the ground.

Supported from the axle 2, and preferably from the rearwardly extending apertured lugs 23 of the bracket 21 are two rearwardly extending bars 97 extending to a point in the rear of the main frame and secured to a suitable shield 98, which preferably comprises two downwardly diverging sheets of metal secured together and connected to the arm 97, the shield being held against vertical movement by a chain 99 secured thereto and extending upwardly and connected to the main frame 1, as shown at 100. The axle 2 is connected to the tongue 4, preferably by brace rods 101 extending from the shaft to the axle and connected to the forwardly extending apertured lugs 23 in the bracket 21 which is secured to the axle.

The two units of the cultivator may be connected one to the other in any suitable manner which will cause the same to move substantially in lateral alinement and will permit the same to move laterally relatively one to the other, as the two units may shift their positions relatively one to the other to accommodate themselves to the furrows in which they are traveling. I prefer to connect the two units by means of a plank 102 resting upon the auxiliary frame 35 and provided with a longitudinal slot 103 through which extends a bolt 104 carried by the auxiliary frame, and connected at its upper end to a rearwardly extending strip 105 which forms a brace therefor. The plank is held against vertical movement relatively to the frame by means of rods 106 connected at their opposite ends to the auxiliary frame and extending above the plank. Thus, it will be seen that this connection is such as to hold the two units of the cultivator in the desired relation one to the other and to permit the same to move laterally relatively one to the other.

Figure 1:
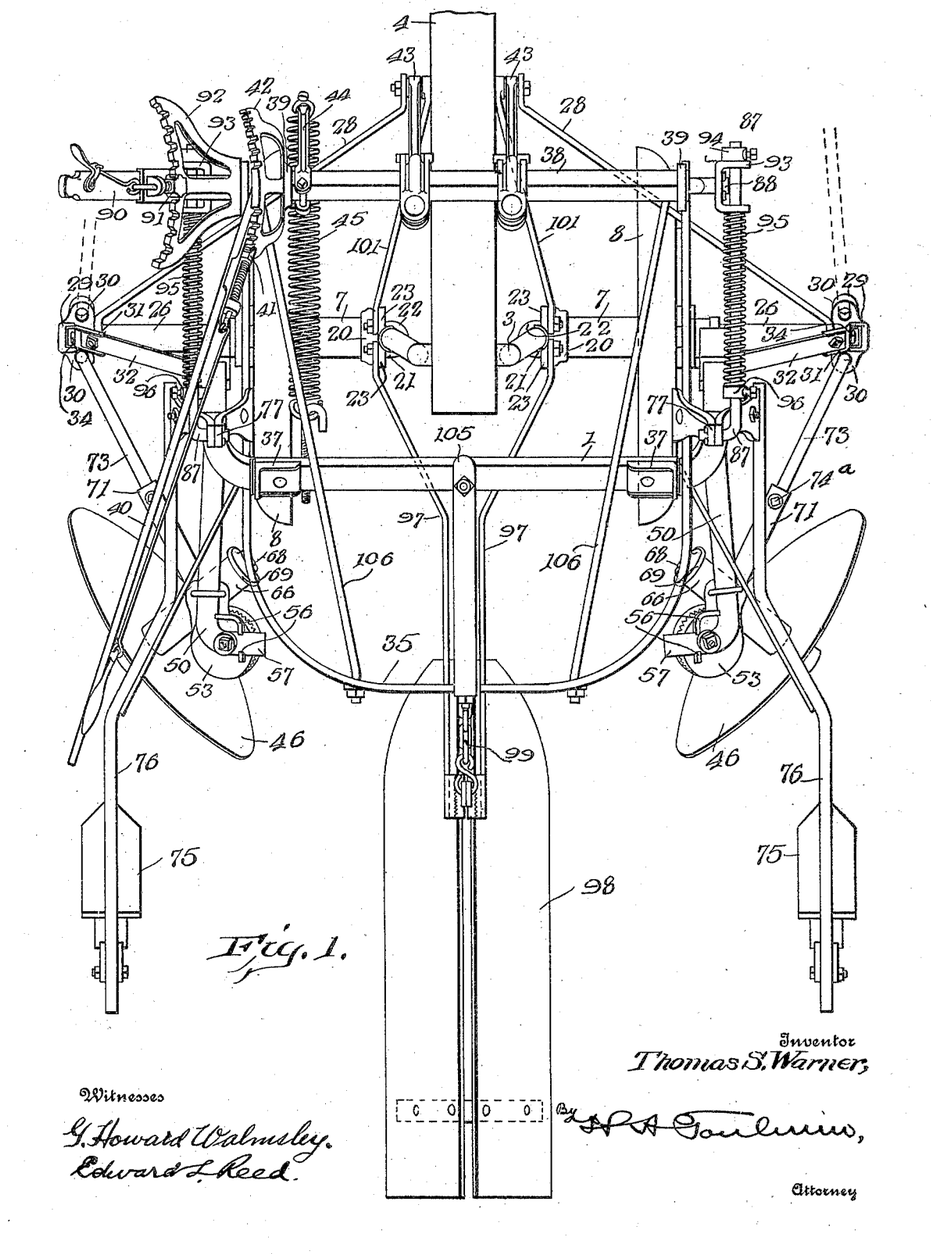
Figure 1 is a top plan view of one of the cultivating units.
Figures 2, 11:
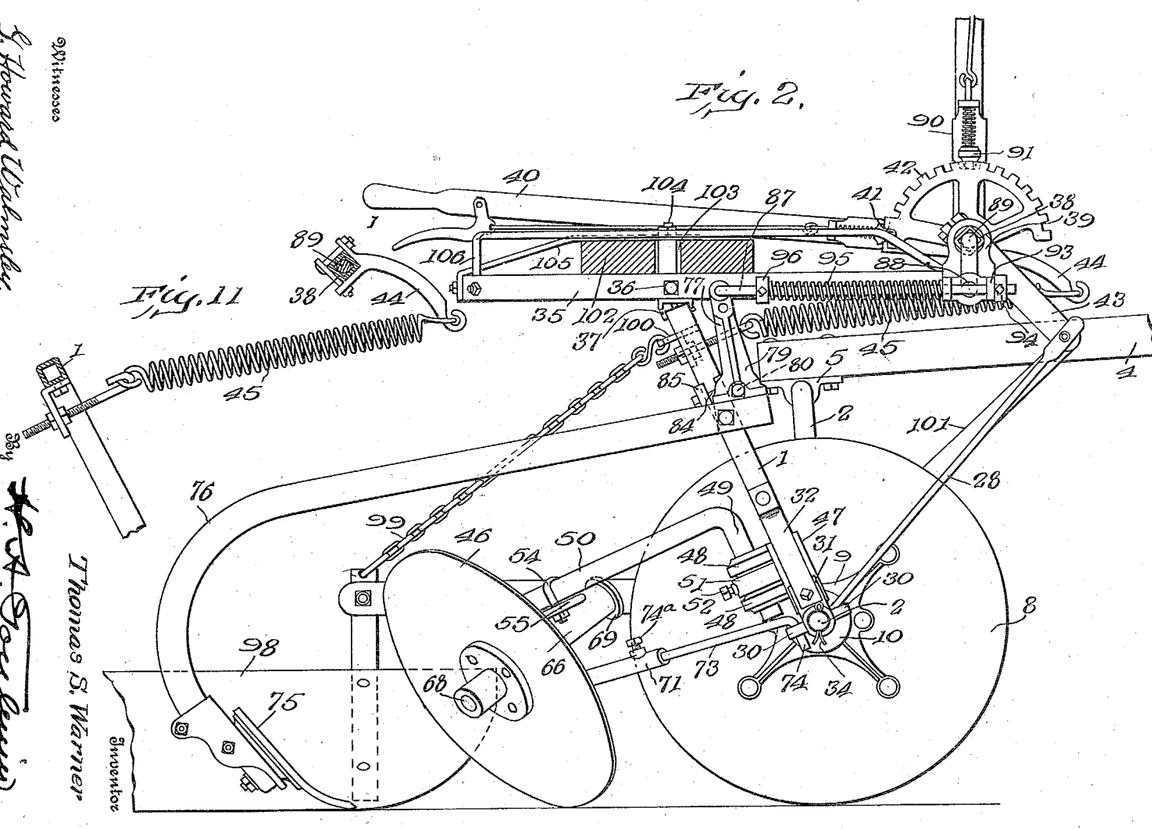
Fig. 2 is a side elevation of the same looking toward the center of the machine.
Fig. 11 is a detail view of a spring extending between the main frame and the operating shaft.
Figure 3:
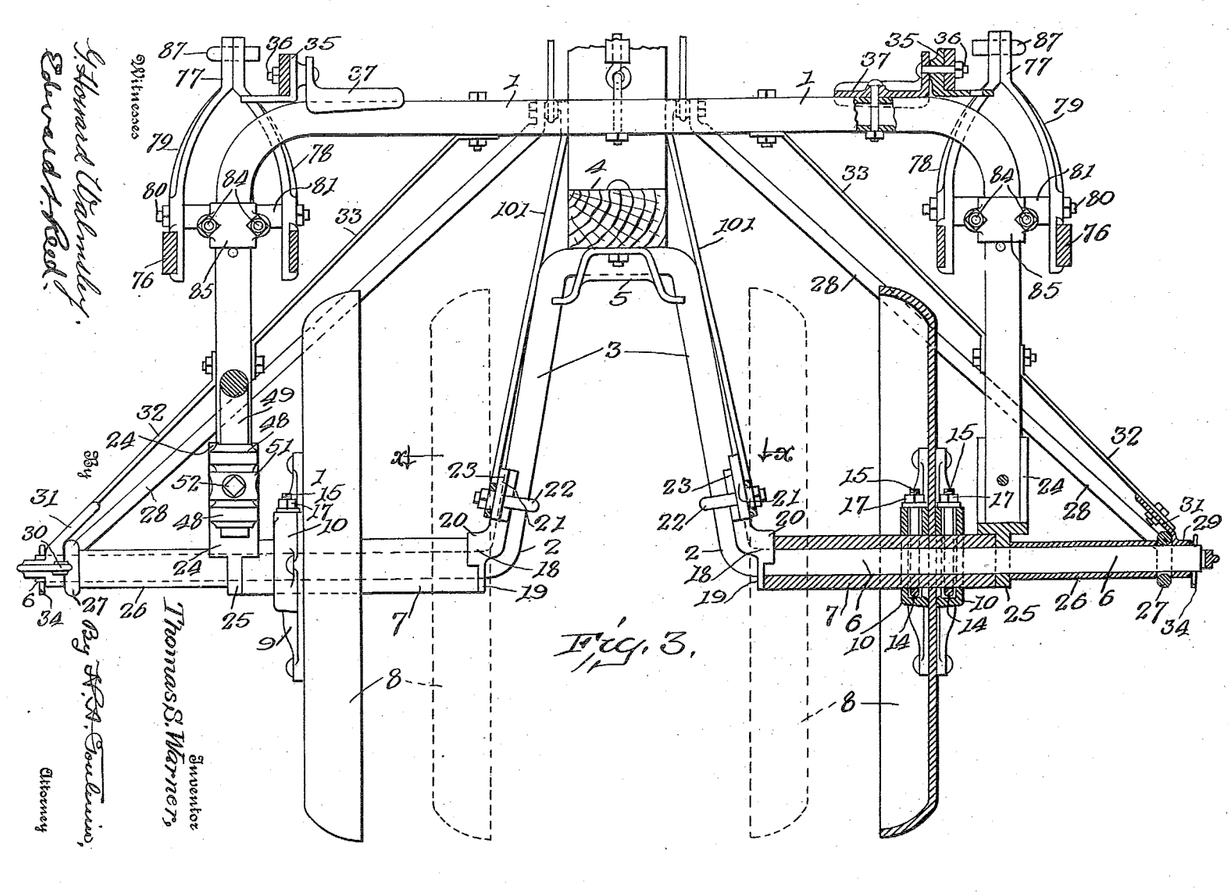
Fig. 3 is a vertical sectional view, taken immediately in the rear of the main frame, showing one of the wheels and its hub partly in section.
Figure 4:
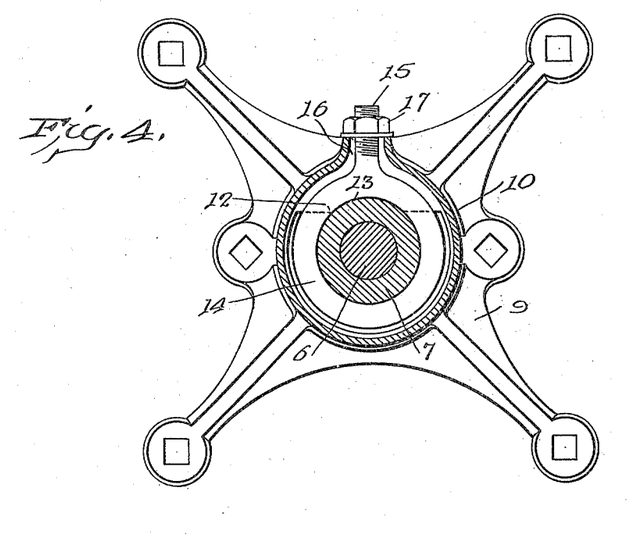
Fig. 4 is a detail of the clamping mechanism for the wheel, showing the auxiliary hub in section.
Figure 5:
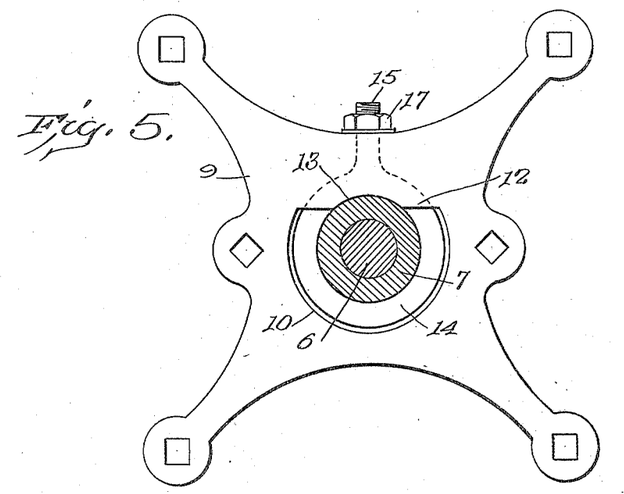
Fig. 5 is a side elevation of the inner face of said clamping member.
Figure 6:
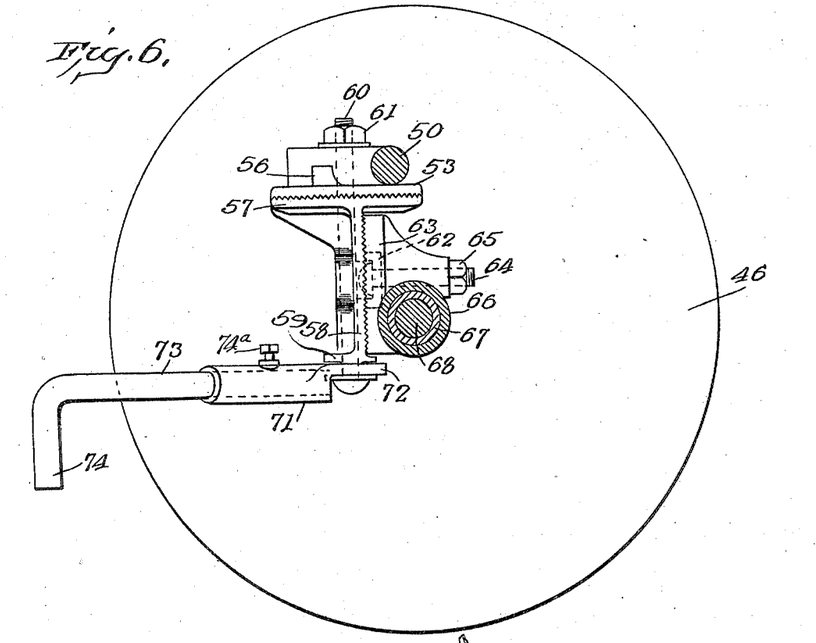
Fig. 6 is a side elevation of the adjusting mechanism for the cultivating disk looking in the direction of the length of said hub.
Figure 7:
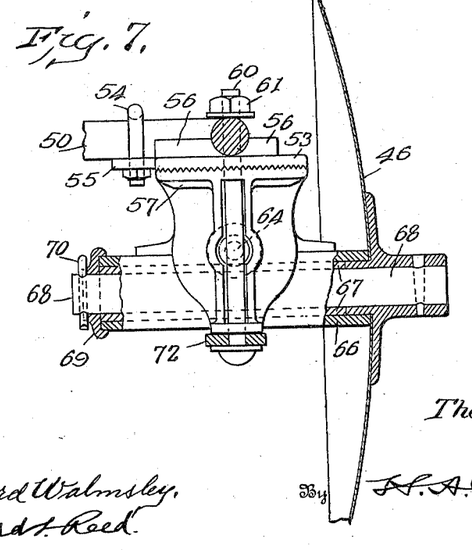
Fig. 7 is a side elevation of the same, taken at right angles to Fig. 6.
Figures 8, 9, 10:
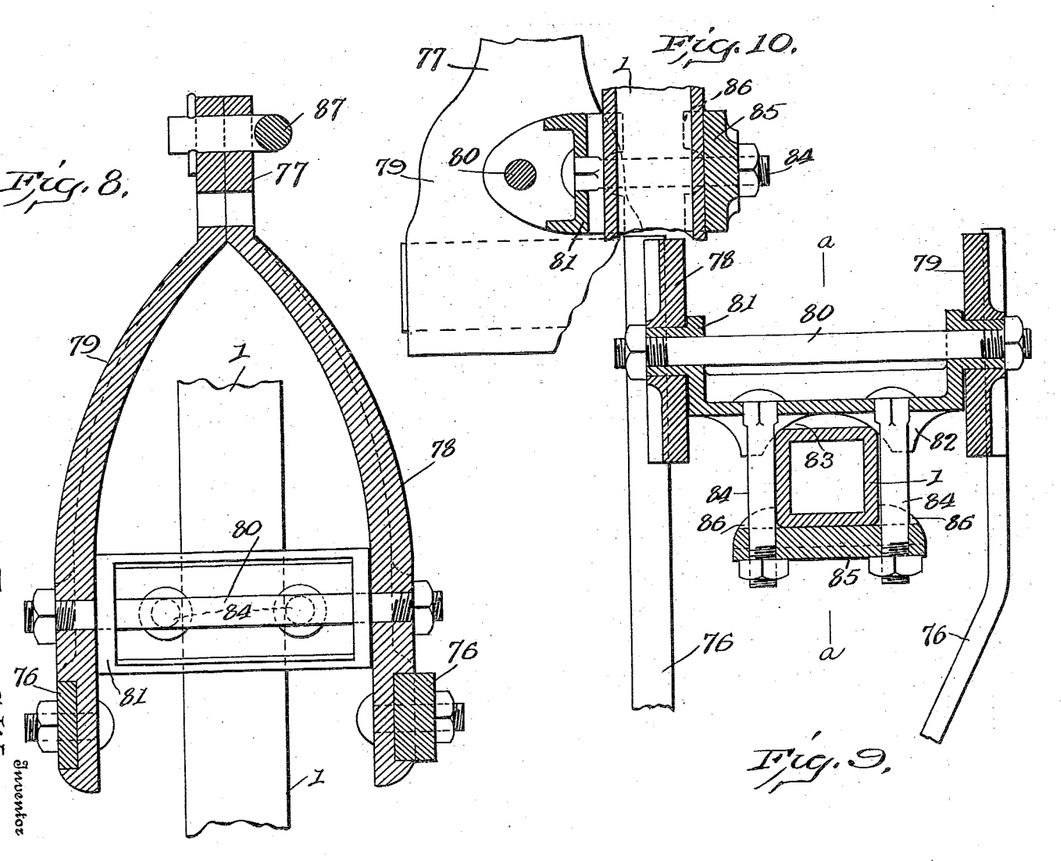
Fig. 8 is a sectional detail view of the pivoted support for the drag bar carrying the cultivating shovel.
Fig. 9 is a transverse sectional view of the same.
Fig. 10 is a detail sectional view, taken on the line $a\ a$ of Fig. 9.
Figure 12:
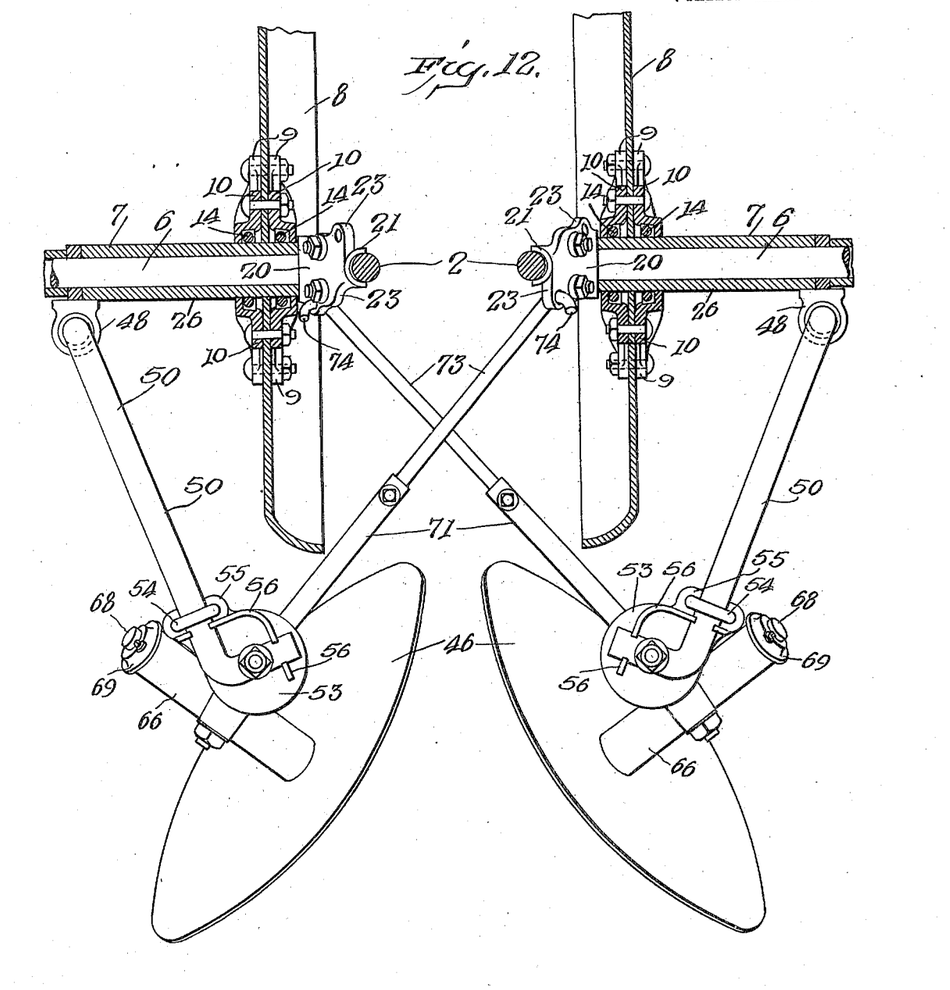
Fig. 12 is a sectional view, taken on the line $x\ x$ of Fig. 3, showing the cultivating disks in detail.

The operation of the device will be readily understood and it will only be necessary to point out the changes in adjustment for the first and second plowing of the corn. In the first plowing of listed corn it is desirable that the cultivating disks should serve only to widen the furrow, throwing the dirt away from the corn while the shovels are set to throw such dirt as desired about the roots of the corn. The disks 46 are shown in Fig. 12 as set for this first plowing and it will be apparent that the disks have been moved inwardly about the pivotal center of the supporting rod therefor and that the brace rod of the disk on one side of the machine has been connected to the aperture in the apertured lug 23 of the bracket 21 secured to the axle on the opposite side of the machine and that the brace rod of the disk on the opposite side of the machine has been connected to the uppermost aperture in the rearwardly extending apertured lug 23 of the bracket 21 on that side of the machine adjacent to the first-mentioned disk, the point of connection of said brace rods being in different horizontal planes and permitting the rods to cross without interfering one with the other. With the supporting rods for the disks in the position shown, the disks themselves are adjusted to engage the ground at such an angle that the dirt is thrown outwardly, while the drag bars for the shovels are detached, and the drag bar, which is shown in Fig. 1 on the right-hand side of the machine, is connected to the inner arm 78 of the lever 77 on the left-hand side of the machine, and the drag bar which is shown in Fig. 1 on the left-hand side of the machine is connected to the inner arm 78 of the lever 77 on the right-hand side of the machine, thus enabling the shovels to be set in close to the corn. The drag bars 76 are preferably provided with offset portions 108 which permit the shovels to be moved farther out of alinement with the vertical member of the main frame. For the second plowing of the corn, the cultivating members are returned to the position shown in Fig. 1, and, in this position, the disks cut away the sides of the furrows, throwing the dirt toward the corn, practically filling the furrow, while the shovels 75 are set to engage the soil at the outer edge of the path of the disk and cut away what remains of the ridge, thereby leaving the field substantially level and free from furrows so that it can be cultivated with an ordinary cultivator. In order to divide the pull from the draft eveners between the several parts of the machine and thus equalize the strain thereon, it is desirable that the draft eveners should be connected to the outer ends of the axles, and, to this end, I provide connecting rods 30$^a$, each of which is secured at one end to the draft evener and at the other end to the forwardly extending apertured lug 30 carried by the collar 29 at the outer end of the axle.

It will be seen from the foregoing description that I have provided a lister cultivator which can be readily adjusted to accommodate the same to rows of corn of various widths, and further, can be readily adjusted, not only to cultivate the corn, but to adapt the machine for the first and second plowing. Further, it will be apparent that the machine is so constructed that practically the whole weight thereof is upon the cultivating members when they are in their operative position and serves to hold the same in proper engagement with the soil, but that, when said members are elevated to their inoperative position, the weight thereof is swung to such a position that it is supported on the forward side of the axle, thus throwing the weight on the tongue and freeing the machine from the drag of such weight and the tendency to tilt under the influence thereof. Further, it will be observed that the frame and cultivating members move through a long low arc, thus avoiding the necessity of lifting the weight of these parts and rendering the operation very easy. Further, it will be observed that the detail construction of the machine is simple, enabling the parts to be made of a strong and durable character and also rendering the operation of the device simple. As above stated, each unit of the cultivator is independent of the other unit and is connected thereto only by the plank 102, each unit being provided with its own operating mechanism. These units cannot be used separately, owing to the short distance between the ground wheels which renders the machine topheavy and would cause the same to tip over where it attempted to use the units individually, but, by coupling the same by means of the plank 102, they are balanced one against the other and a complete operative machine is provided.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a cultivator, the combination, with a cranked axle, ground wheels mounted thereon, and a tongue secured to the central portion of said cranked axle, of a frame mounted on the end portions of said cranked axle and adapted to swing to the front and to the rear thereof, means connected with said tongue and with said frame for actuating said frame, and a cultivating member carried by said frame.

2. In a cultivator, the combination, with an axle, ground wheels mounted thereon, and a tongue secured to said axle, of a frame mounted to swing to the front and to the rear of said axle, a part carried by said frame and extending forwardly to a point near said tongue, a link connected with the part carried by said frame and pivotally mounted on said tongue, means for moving said link about its point of connection to said tongue, and a cultivating member carried by said frame.

3. In a cultivator, the combination, with an axle, ground wheels mounted thereon, and a member secured to said axle, of a frame mounted to swing to the front and to the rear of said axle, a shaft supported from said frame, a link rigidly secured at one end to said shaft and connected at its other end with the member secured to said axle, means for rotating said shaft, and cultivating members supported from said frame.

4. In a cultivator, the combination, with an axle, ground wheels mounted thereon, and a member secured to said axle, of a main frame mounted to swing to the front and to the rear of said axle, an auxiliary frame connected to said main frame and extending forwardly therefrom, a link connecting said auxiliary frame to the member secured to said axle, and means carried by said auxiliary frame for actuating said link, and a cultivating member supported from said main frame.

5. In a cultivator, the combination, with an axle, ground wheels mounted thereon, and a member secured to said axle, of a main frame mounted to swing to the front and to the rear of said axle, an auxiliary frame pivotally connected to said main frame, a link connected at one end to said auxiliary frame and pivotally connected at its other end to the member secured to said axle, means carried by said auxiliary frame for moving said link about its pivotal center, and a cultivating member carried by said main frame.

6. In a cultivator, the combination, with an axle, ground wheels mounted thereon, and a member secured to said axle, of a main frame mounted to swing to the front and to the rear of said axle, an auxiliary frame pivotally supported on said main frame, a shaft journaled on said auxiliary frame, a link rigidly connected at one end to said shaft and pivotally connected at its opposite end to the member secured to said axle, means for rotating said shaft, and a cultivating member supported from said main frame.

7. In a cultivator, the combination, with an axle, ground wheels mounted thereon, and a member secured to said axle, of a main frame mounted to swing to the front and to the rear of said axle, an auxiliary frame pivotally supported on said main frame, a hollow shaft journaled on said auxiliary frame, a link rigidly connected at one end to said shaft and pivotally connected at its opposite end to the member secured to said axle, means for rotating said shaft, and a cultivating member supported from said main frame.

8. In a cultivator, the combination, with an axle, ground wheels mounted thereon, and a member secured to said axle, of a main frame mounted to swing to the front and to the rear of said axle, an auxiliary frame pivotally supported on said main frame, bearings mounted on said auxiliary frame, a shaft journaled in said bearings, a link rigidly connected at one end to said shaft and at its other end to the member secured to said axle, a lever secured to one end of said shaft, a spring-pressed dog carried by said lever, a toothed rack mounted on one of said bearings and adapted to be engaged by said dog, and a cultivating member supported from said main frame.

9. In a cultivator, the combination, with an axle, ground wheels mounted thereon, and a member secured to said axle, of a main frame mounted to swing to the front and to the rear of said axle, an auxiliary frame pivotally supported from said main frame, a shaft journaled on said auxiliary frame, means for rotating said shaft, a link rigidly secured at one end to said shaft and pivotally connected at its other end to the member secured to said axle, an arm rigidly secured to said shaft, a spring connected at one end to said arm and at its other end to said main frame, and a cultivating member supported from said main frame.

10. In a cultivator, the combination, with an axle having an upwardly extending central portion, ground wheels mounted on said axle on opposite sides of said upwardly extending portion, and a tongue secured to the upwardly extending portion of said axle, of a main frame pivotally supported on said axle, an auxiliary frame pivotally supported on said main frame, a shaft journaled on said auxiliary frame, links rigidly connected at one end to said shaft and pivotally connected at the opposite end to said tongue, means for rotating said shaft, and cultivating members supported from said main frame.

11. In a cultivator, the combination, with an axle, a main frame pivotally mounted thereon, and means for swinging said main frame to the front and to the rear of said axle, of ground wheels mounted on said axle and each comprising an elongated hub and a wheel portion mounted on said hub and adjustable longitudinally thereto.

12. In a cultivator, the combination, with an axle, and a main frame supported therefrom, of a ground wheel mounted on said axle and comprising an elongated hub having a wheel portion adjustable longitudinally thereof, said axle extending beyond the outer end of said elongated hub, and means for connecting the draft hitch to the outer end of said axle.

13. In a cultivator, the combination, with an axle, a ground wheel adjustably mounted thereon, a frame pivotally mounted on said axle beyond said ground wheel, a sleeve mounted on said axle beyond the point of connection of said main frame, a collar secured to said axle beyond said sleeve, and apertured lugs on said collar on opposite sides of said axle.

14. In a cultivator, the combination, with an axle, having an upwardly extending central portion, a tongue connected to said upwardly extending portion, a ground wheel mounted on said axle and comprising an elongated hub, and a wheel portion adjustably mounted on said hub, of a main frame having an apertured lug extending about said axle near one end of said elongated hub, a sleeve mounted on said axle beyond said apertured lug, a brace secured at one end to said axle beyond said sleeve and connected at its other end to said tongue, a collar mounted on said axle beyond said brace and having apertured lugs extending from the opposite sides of said axle, and a brace extending between said collar and said main frame.

15. In a cultivator, an axle having an upwardly extending central portion, and wheels mounted on said axle and having hubs extending to a point near said upwardly extending portion, of a bracket secured to said upwardly extending portion of said axle and having a flange adapted to extend over the adjacent end of the hub of said wheel and having oppositely extending vertically arranged apertured lugs.

16. In a cultivator, the combination, with an axle, ground wheels therefor, and a main frame supported from said axle and having an upright portion, of a supporting arm having a downwardly extending portion, bearing lugs carried by the upright portion of said main frame and adapted to receive the downwardly extending portion of said arm, and a cultivating disk adjustably supported from the outer end of said arm.

17. In a cultivator, the combination, with an axle, ground wheels therefor, and a main frame supported from said axle, of a supporting arm pivotally connected at one end to said main frame, a cultivating disk mounted on the outer end of said supporting arm, and a brace extending from the outer end of said supporting arm for said cultivating disk to said axle.

18. In a cultivator, the combination, with an axle, ground wheels therefor, and a main frame supported from said axle at a point removed from the outer end thereof, of a supporting arm pivotally connected at one end to said main frame, a cultivating disk supported at the outer end of said supporting arm, and a brace extending between said cultivating member and the outer end of said axle.

19. In a cultivator, the combination, with an axle, ground wheels therefor, and a main frame supported on said axle at a point removed from the end thereof, of a supporting arm pivotally connected at one end to said main frame, a cultivating disk adjustably supported from the outer end of said arm, and an adjustable brace extending between said cultivating disk and the outer end of said axle.

20. In a cultivator, the combination, with an axle, ground wheels therefor, and a main frame supported on said axle and having an upright portion, of a lever pivotally supported between its ends on said upright portion, a drag bar secured to one end of said lever, and means connected to the other end of said lever for actuating the same about its pivotal center.

21. In a cultivator, the combination, with an axle, ground wheels therefor, and a main frame supported from said axle, of a bifurcated lever pivotally mounted on said main frame and having downwardly extending arms, a drag bar secured to one of said arms, and means for actuating said lever about its pivotal center.

22. In a cultivator, the combination, with an axle, ground wheels therefor, and a main frame mounted to swing to the front and to the rear of said axle, a drag bar supported from said main frame, and means for moving said main frame to the front or to the rear of said axle.

23. In a cultivator, the combination, with an axle, ground wheels therefor, and a main frame mounted to swing to the front or to the rear of said axle, of a drag bar pivotally supported from said main frame, means for actuating said main frame, and means for moving said drag bar about its pivotal center.

24. In a cultivator, the combination, with an axle, ground wheels therefor, and a main frame mounted to swing to the front and to the rear of said axle, of a lever pivotally supported on said main frame, a drag bar secured to said lever, and means for moving said lever about its pivotal center.

25. In a cultivator, the combination, with an axle, ground wheels therefor, a main frame mounted to swing to the front and to the rear of said axle, and an auxiliary frame supported on said main frame, of a lever pivotally mounted on said main frame, a drag bar secured to said lever, a shaft mounted on said auxiliary frame, means for rotating said shaft, and means for operatively connecting said shaft to said lever.

26. In a cultivator, the combination, with an axle, ground wheels therefor, a main frame mounted to swing to the front and to the rear of said axle, and an auxiliary frame mounted on said main frame, of a lever pivotally mounted on said main frame, a drag bar secured to said lever, a shaft mounted on said auxiliary frame, a crank arm secured to said shaft, a bearing sleeve carried by said crank arm, a rod slidably mounted in said bearing sleeve and connected at one end to said lever, a stop mounted on said rod near said lever, a spring coiled about said rod between said stop and said sleeve, a stop on the outer end of said rod to prevent its withdrawal from said sleeve, and means for rotating said shaft.

27. In a cultivator, the combination, with an axle, ground wheels therefor, a forwardly extending member secured to said axle, a main frame mounted to swing to the front and to the rear of said axle, and an auxiliary frame mounted on said main frame, of a lever pivotally mounted on said main frame, a drag bar secured to said lever, a hollow shaft mounted on said auxiliary frame, a link rigidly secured at one end to said hollow shaft and pivotally connected at its opposite end to said forwardly extending member, a shaft journaled within said hollow shaft, means for rotating said second shaft, and means for operatively connecting said second shaft to said lever.

28. In a cultivator, the combination, with an axle, ground wheels therefor, and a main frame mounted on said axle, of a lever pivotally mounted on said main frame, means for adjusting said lever about a substantially vertical axis relatively to said main frame, and means for moving said lever about its pivotal center.

29. In a cultivator, the combination, with an axle, ground wheels therefor, and a main frame supported from said axle and having an upright portion, of a drag bar pivotally supported from the upright portion of said main frame, and means for adjusting said drag bar about an axis extending longitudinally of said upright portion of said main frame.

30. In a cultivator, the combination, with an axle, ground wheels therefor, and a main frame supported from said axle and having an upright portion, of a lever pivotally supported on said upright portion and adapted to be adjusted about a vertical axis extending longitudinally of said upright portion, and a drag bar secured to said lever.

31. In a cultivator, the combination, with an axle, ground wheels therefor, and a main frame supported from said axle and having an upright member, of a bracket rigidly secured to said upright portion and adjustable about an axis extending longitudinally of said upright portion, and a drag bar pivotally supported from said bracket.

32. In a cultivator, the combination, with an axle, ground wheels therefor, and a main frame supported from said axle and having an upright portion, of a bracket having a curved recess adapted to extend about the upright portion of said main frame, bolts extending through said bracket on the opposite sides of said upright portion, and a clip extending across said upright portion on the side opposite said bracket and adapted to receive said bolts, and a drag bar pivotally supported from said bracket.

33. In a cultivator, the combination, with an axle, ground wheels therefor, and a main frame having an upright portion, of a bifurcated lever pivotally mounted on said main frame and having one arm of its bifurcation located on each side of said upright portion, and a drag bar secured to one of said arms.

In testimony whereof, I affix my signature in presence of two witnesses.

THOMAS S. WARNER.

Witnesses:
ELZA McKEE,
EDWARD L. REED.